United States Patent [19]

Cohn et al.

[11] Patent Number: 4,810,683

[45] Date of Patent: Mar. 7, 1989

[54] REGENERATION OF A PLATINUM-CONTAINING ZEOLITE

[75] Inventors: Michelle J. Cohn, Mt. Prospect; Delmar W. Robinson; R. Joe Lawson, both of Palatine, all of Ill.

[73] Assignee: UOP Inc., Des Plaines, Ill.

[21] Appl. No.: 148,301

[22] Filed: Jan. 25, 1988

[51] Int. Cl.$^4$ ............................................. B01J 38/44
[52] U.S. Cl. .................................... 502/37; 208/140
[58] Field of Search ......................... 502/37; 208/140

[56] References Cited

U.S. PATENT DOCUMENTS

| | | | |
|---|---|---|---|
| 3,625,860 | 12/1971 | Condrasky | 208/140 |
| 3,751,379 | 8/1973 | Hayes | 502/37 |
| 3,753,926 | 8/1973 | Hayes | 252/415 |
| 3,875,049 | 4/1975 | Kluksdahl | 208/140 |
| 3,939,062 | 2/1976 | Sinfelt et al. | 208/140 |
| 3,986,982 | 10/1976 | Crowson et al. | 502/37 |
| 4,094,814 | 6/1978 | Lemberger et al. | 502/37 |
| 4,094,817 | 6/1978 | Olson et al. | 502/37 |
| 4,416,806 | 11/1983 | Bernard et al. | 502/74 |
| 4,417,083 | 11/1983 | Bernard et al. | 585/419 |
| 4,493,901 | 1/1985 | Bernard et al. | 502/37 |
| 4,619,906 | 10/1986 | Lambert et al. | 502/66 |
| 4,645,751 | 2/1987 | McCullen et al. | 502/37 |
| 4,657,874 | 4/1987 | Borghard et al. | 502/37 |
| 4,689,312 | 8/1987 | Ngoc Le et al. | 502/38 |

Primary Examiner—Patrick P. Garvin
Assistant Examiner—Elizabeth D. Irzinki
Attorney, Agent, or Firm—Thomas K. McBride; John F. Spears, Jr.; A. Blair Hughes

[57] ABSTRACT

A method is described for the regeneration of a hydrocarbon conversion catalyst that has become deactivated by carbonaceous material deposition where the catalyst comprises a nonacid zeolite and a Group VIII metal component. The method comprises the steps of (1) removing a substantial portion of the carbonaceous material from the catalyst by combustion with an oxygen-containing gas in the presence of a halogen, and (2) reducing the catalyst in the presence of hydrogen.

14 Claims, No Drawings

REGENERATION OF A PLATINUM-CONTAINING ZEOLITE

BACKGROUND OF THE INVENTION

The subject of the present invention is a method for regenerating a coke-deactivated hydrocarbon conversion catalyst. The catalyst comprises a combination of a nonacidic zeolite and at least one Group VIII metal component. More specifically, the present invention provides a specific catalyst carbon burn procedure designed to result in a regenerated catalyst possessing activity, selectivity, and stability characteristics quite similar to those observed in the fresh catalyst.

Catalytic composites containing zeolites are well known in the art and are commonly used in the conversion of a wide variety of hydrocarbons. Recently, the use of L-zeolites in combination with other catalytic components has been discovered to be an effective catalyst for converting light paraffinic hydrocarbons into $C_6$-plus aromatics. The $C_6$- plus aromatics produced in such a conversion process are valuable as they have a higher octane rating than the feedstock and are useful gasoline blending components. Additionally, the aromatics can be recovered from the product for further processing.

Hydrocarbon conversion catalysts typically become deactivated by deposition of carbon upon the catalyst and also through agglomeration of the previously dispersed catalytic components contained in the catalyst. The regeneration of such deactivated catalysts is an important aspect of many hydrocarbon conversion processes. As a result, many methods are known to regenerate catalysts, and even zeolite-containing catalysts. However, especially where zeolite catalysts are concerned, these methods more often than not do not result in the catalyst being returned to a level of activity that approaches that of the fresh catalyst.

OBJECTS AND EMBODIMENTS

It is an object of this invention to provide a method for regenerating a catalytic composite that has been deactivated in part due to the deposition of carbonaceous materials upon the catalyst. The method disclosed has been found to be most effective in restoring the activity of a catalyst comprising a nonacidic zeolite component, and a Group VIII metal component.

Accordingly, a broad embodiment of the invention is a method for regenerating a deactivated hydrocarbon conversion catalyst where the catalyst is comprised of a nonacidic zeolite and a Group VIII metal component. The method is useful where the deactivation is due in part at least to the deposition of carbonaceous materials upon the catalyst as a result of previous contact with a hydrocarbon at hydrocarbon conversion conditions. The method disclosed comprises the first step of contacting the deactivated catalyst with a gaseous stream comprising oxygen, a halogen or a halogen-containing compound or a mixture thereof, and an inert component at regeneration conditions including a temperature of from 350°–600° C. sufficient to combust at least a portion of said carbonaceous materials for a first period of time. This first step is followed by the second step of reducing the catalyst by contacting the catalyst with a gaseous stream comprising hydrogen at an elevated temperature for a period of time sufficient to produce a reduced/regenerated hydrocarbon conversion catalyst.

In a most preferred embodiment, this invention is a method for regenerating a deactivated hydrocarbon conversion catalyst comprising an L-zeolite bound within a support matrix comprising alumina, platinum, and sufficient surface-deposited potassium to provide a surface-deposited alkali metal index of 10. The catalyst having been deactivated in part by deposition of carbonaceous materials as a result of previous contact with a hydrocarbon feedstock at hydrocarbon conversion conditions. The regeneration method comprises the steps of contacting the deactivated catalyst with a gaseous stream comprising oxygen, hydrogen chloride, and an inert component at regeneration conditions including a temperature of from 350°–600° C. and a gaseous stream oxygen concentration of from 0.1 to 21.0 mole percent sufficient to combust at least a portion of said carbonaceous materials for a first period of time. The catalyst is next reduced by contacting the catalyst with a gaseous stream comprising hydrogen at a temperature of from 370°–600° C. for a second period of time sufficient to produce a reduced and regenerated hydrocarbon conversion catalyst.

DESCRIPTION OF THE PRIOR ART

The deactivation of Group VIII metal-containing hydrocarbon conversion catalysts due to the deposition of carbonaceous materials upon the catalyst is a phenomenon which has received much attention in technical literature. The deactivation problem is particularly troublesome regarding Group VIII metal-containing nonacidic zeolite catalysts employed in the reforming or dehydrocyclization of light paraffin or naphtha-containing hydrocarbon feedstocks. Undesired metal migration and zeolite lattice destruction can occur during the oxidative regeneration of such catalysts resulting in significant decline in catalyst properties such as activity and selectivity.

Numerous nonacidic zeolite-containing catalysts which also contain a Group VIII metal component are known in the prior art and are useful as the catalyst of the present invention. Such catalysts are described in U.S. Pats. Nos. 4,417,083; 4,416,806; and 4,619,906. Each of the catalysts above contains a Group VIII metal component located on a nonacidic zeolite-containing catalyst. In addition, most of the catalysts contain a desirable alkali metal component. The U.S. Pat. No. 4,619,906 patent in particular describes a most preferred catalyst which contains a surface-deposited alkali metal component in addition to a Group VIII metal component and a nonacidic zeolite component. It must be noted that the disclosures mentioned above do not disclose a preferred method of regenerating the catalysts and therefore they do not describe the regeneration method of the instant invention.

Methods to regenerate a spent catalyst comprising a Group VIII metal component and a non acidic zeolite component are also known in the art. U.S. Pat. No. 4,493,901 describes a method of regenerating a catalyst comprising platinum and a nonacidic L-zeolite. However, the method described in the U.S. Pat. No. 4,493,901 patent discloses a regeneration method whereby the catalyst is first exposed to a hydrogen atmosphere, followed by a carbon burn step, and then a calcination step followed by an oxychlorination step. This is unlike the method of the instant invention which utilizes a halogen during the carbon burn step followed by a reduction step.

U.S. Pat. No. 4,689,312 discloses a method to regenerate a catalyst containing platinum on a zeolite. However, the method disclosed in the U.S. Pat. No. 4,689,312 patent unlike the method of the instant invention does not employ a halogen or halogen-containing compound to maintain the distribution of the Group VIII metal on the catalyst during the carbon burn step.

In another regeneration method similar to that of the instant invention, U.S. Pat. No. 4,645,751 discloses the use of a combination oxygen, hydrogen halide-containing gas to oxidize a noble metal, and highly siliceous zeolite-containing catalyst. In addition, a rejuvenation step is disclosed in which the catalyst is exposed to oxygen and a halide or halide-containing compound after the "noncritical" carbon burn step between reduction steps. The method disclosed in the U.S. Pat. No. 4,465,751 disclosure differs from the instant method first in that the catalyst regenerated is not a nonacidic zeolite-containing catalyst. In addition, in the regeneration method of the instant invention, it is critical that the halogen or halogen-containing component is included in the oxygen-containing gas during the carbon burn step as this eliminates the need for further rejuvenation steps in the instant case save for a catalyst reduction step.

Yet another regeneration method similar to that of the instant invention is disclosed in U.S. Pat. No. 3,753,926. The U.S. Pat. 3,753,926 patent describes a catalyst regeneration method which utilizes a carbon burn type step followed by an oxidation and reduction step. The carbon burn and oxidation steps are accomplished in the presence of a halogen. Additionally, the method is useful for regenerating a catalyst comprising platinum on a refractory inorganic oxide base. The method of the U.S. Pat. No. 3,753,926 patent varies from the method of the instant invention in various ways. The regeneration method disclosed in the U.S. Pat. No. 3,753,926 patent utilizes an oxidation step including halogen addition following the carbon burn step. The method of the instant invention does not require an oxychlorination step to return the previously deactivated catalyst to a high level of activity. Additionally, the catalyst that is usefully regenerated by the prior art method does not contain a zeolite component so it is unclear from the disclosure if the method of the U.S. Pat. No. 3,753,926 patent would be useful in the regeneration of a difficult to regenerate zeolite-containing catalyst.

Catalysts upon which the regeneration method of the instant invention may be useful in regenerating have been disclosed in the prior art. However, the particular regeneration method of the instant invention useful for the regeneration of a nonacidic zeolite-containing catalyst has not been described in any prior art disclosure. As a result, the advantages of using the instant regeneration method on a catalyst comprising a nonacidic zeolite and a Group VIII metal component has been unknown in the art until this time.

DETAILED DESCRIPTION OF THE INVENTION

The present invention encompasses a regeneration method which is applicable to a catalyst comprising a nonacidic zeolite and a Group VIII metal component. The regeneration method results in a regenerated catalyst with conversion characteristics quite similar to those of the fresh catalyst.

As heretofore indicated, it is an essential feature of the catalyst of the present invention that it comprises a nonacidic zeolite. By "nonacidic zeolite", it is meant that the zeolite has substantially all of its cationic sites of exchange occupied by nonhydrogen cationic species. Preferably, such cationic species will comprise alkali metal cations although other cationic species may be present. Irrespective of the actual cationic species present in the sites of exchange, the nonacidic zeolite in the present invention has substantially all of the cationic sites occupied by nonhydrogen cations, thereby rendering the zeolite substantially fully cationic exchanged. Many means are well known in the art for arriving at a substantially fully cationic exchanged zeolite and thus they need not be elaborated herein. The nonacidic zeolite of the present invention acts to modify the catalytic Group VIII metal and is substantially inert in the reaction.

Typical of the nonacidic zeolites which may be utilized in the present invention are X-zeolite, Y-zeolite, and mordenite. Especially preferred in application of the present invention is L-zeolite. The catalytic composite of the present invention may also comprise a mixture of different zeolites. Of course, each of the zeolites employed in the invention must be in nonacidic form as defined above and, therefore, the cationic exchangeable sites are substantially fully cationic exchanged with nonhydrogen cationic species. As also indicated above, typically the cations occupying the cationic exchangeable sites will preferably comprise one or more of the alkali metals including lithium, sodium, potassium, rubidium, and cesium. Accordingly then, the nonacidic zeolite of the present invention may comprise the sodium forms of X-zeolite, Y-zeolite, or mordenite. An especially preferred nonacidic zeolite for application in the present invention is the potassium form of L-zeolite. It should also be understood, however, that the nonacidic zeolite of the invention may contain more than one type of the alkali metal cation at the cationic exchangeable sites, for example, sodium and potassium.

The nonacidic zeolite-containing catalyst useful in the instant regeneration method is preferably bound with a support matrix. The support matrix of the present invention may comprise any support matrix typically utilized to bind zeolitic-containing catalytic composites. Such support matrices are well known in the art and include clays, bauxite, refractory inorganic oxides such as alumina, zirconium dioxide, hafnium oxide, beryllium oxide, vanadium oxide, cesium oxide, chromium oxide, zinc oxide, magnesia, thoria, boria, silica-magnesia, chromia-alumina, alumina-boria, etc. A preferred support matrix comprises silica, and an especially preferred support matrix comprises alumina. It is a further preferred that the support matrix be substantially inert to the reactants to be converted by the composite as well as the other constituents of the composite. To this end, it is preferred that the support matrix be nonacidic to avoid promotion of undesirable side-reactions. Such nonacidity may be induced by the presence of alkali metals.

The nonacidic zeolite may be bound within the support matrix by any method known in the art. Such methods include pilling, extruding, granulating, marumarizing, etc. Particularly preferred methods are the so-called oil-drop method, or extrusion.

Typically, in binding a zeolite in a support matrix by means of the oil-drop method, powdered zeolite is admixed with a sol comprising the desired support matrix or precursors thereof, and a gelling agent. Droplets of the resulting admixture are dispersed as spherical droplets in a suspending medium, typically oil. The gelling agent thereafter begins to cause gelation of the sol as a result of the change in the sol pH. The resulting gelled support matrix has bound therein the zeolite. The suspending medium helps maintain the spherical shape of the droplets. Usable suspending mediums include Nujol, kerosene, selected fractions of gas oil, etc. Many gelling agents are known in the art and include both acids and bases. Hexamethylenetetramine is only one such known gelling agent. The hexamethylenetetramine slowly decomposes to ammonia upon heating. This results in a gradual pH change and as a result a gradual gelation.

Extrusion is another catalyst formulation method useful in the preparation of a catalyst that can be usefully regenerated by the method of the instant invention. In general the extrusion method of preparing a catalyst composite comprises combining a powdered form of the desired zeolite with a powdered support matrix such as one selected from the group mentioned above. The powders are combined with a liquid peptizing agent to transform the powder into a dough. The choice of peptizing agent will vary depending upon the support matrix chosen. The peptizing agent can be an acid such as nitric acid, acetic acid, citric acid, or the like. The peptizing agent may also be a base such as a hydroxide or ammonia.

The dough produced by adding the peptizing agent is then extruded through an appropriately sized die plate to produce cylindrical particles. The extrudate is then dried and calcined at conditions known in the art followed by deposition of catalytic components such as a Group VIII metal component upon the catalyst by means known in the art.

Regardless of the exact method of binding the nonacidic zeolite in the support matrix, sufficient nonacidic zeolite may be used to result in a catalytic composite comprising from about 20 to about 80 wt. % nonacidic zeolite based on the weight of the zeolite and support matrix. The exact amount of nonacidic zeolite advantageously included in the catalytic composite of the invention will be a function of the specific nonacidic zeolite, the support matrix, and the specific application of the catalytic composite. A catalytic composite comprising about 50 to 75 wt. % potassium form of L-zeolite bound in alumina is preferred.

A further essential feature of the catalyst of the present invention is the presence of catalytically effective amounts of a Group VIII metal component, including catalytically effective amounts of nickel, ruthenium, rhodium, osmium, palladium, iridium, platinum, or mixtures thereof. Especially preferred among the Group VIII metal components is platinum. The Group VIII metal component may be composited with the other constituents of the catalytic composite by any suitable means known in the art. For example, a platinum component may be impregnated by means of an appropriate solution such as a dilute chloroplatinic acid solution. Alternatively, the Group VIII metal component may be composited by means of ion exchange in which case some of the cationic exchange sites of the nonacidic zeolite may contain Group VIII metal cations. After ion exchange, the Group VIII metal may be subject to a low temperature oxidation prior to any reduction step. The Group VIII metal component may be composited with the other constituents either prior or subsequent to the deposition of the hereinafter described optional surface-deposited alkali metal. Additionally, the Group VIII metal may be composited with the nonacidic zeolite and thereafter the nonacidic zeolite-containing Group VIII metal may be bound with the support matrix.

In addition to comprising a Group VIII metal component, it is contemplated in the present invention that the catalyst thereof may contain other metal components well known to have catalyst modifying properties. Such metal components include components of rhenium, tin, cobalt, indium, gallium, lead, zinc, uranium, thallium, dysprosium, and germanium, etc. Incorporation of such metal components have proven beneficial in catalytic reforming as promoters and/or extenders. Accordingly, it is within the scope of the present invention that catalytically effective amounts of such modifiers may be beneficially incorporated into the catalyst of the present invention.

Irrespective of the particular Group VIII metal component of catalytic modifiers composited in the catalyst of the invention, the catalyst of the present invention comprises an optional surface-deposited alkali metal sufficient to provide a surface-deposited alkali metal index of at least 10 and preferably from about 40 to about 500. It is to be understood that by "surface-deposited alkali metal", it is meant that the alkali metal component is not associated with a cationic exchangeable site, but rather is excess alkali metal component above that amount required to occupy substantially all of the cationic exchangeable sites. It is to be further understood that the surface-deposited alkali metal index is indicative of the amount of such surface-deposited alkali metal. As used herein, the term "surface-deposited alkali metal index" is defined as $10^4$ multiplied by the moles per liter of soluble alkali metal yielded by the weight of catalytic composite comprising 0.5 g of nonacidic zeolite placed in 10 cc of deionized water as measured by an electrode sensitive to said alkali metal at 25° C.

Any of the alkali metals may be used as the surface-deposited alkali metal including lithium, sodium, potassium, rubidium, cesium, and mixtures thereof. The surface-deposited alkali metal giving the best results will depend on the particular nonacidic zeolite used. Potassium on the potassium form of L-zeolite is especially preferred. Additionally, sodium on the sodium form of X-zeolite or Y-zeolite may also be advantageously employed.

The surface-deposited alkali metal may be composited with the catalyst of the present invention by any suitable technique. Standard impregnation technique may be employed utilizing an aqueous solution of an alkali metal salt. Either basic or neutral salts may be used. For example, when surface-depositing potassium on a catalyst comprising the potassium form of L-zeolite, the impregnation solution may comprise a basic salt of potassium such as $KHCO_3$, $K_2CO_3$, KOH, etc. Alternatively, a solution comprising neutral potassium salt such as KCl may be used.

As previously indicated, the catalyst regenerated by the method of the instant invention becomes deactivated at least partially as a result of carbon accumulation on the catalyst due to contacting the catalyst with a hydrocarbon at hydrocarbon conversion conditions. The catalyst of the present invention may become deactivated through use in a wide variety of hydrocarbon conversion conditions. The exact conditions will depend upon the particular charge stock and reaction to be effected. Generally, these conditions include a temperature of from about 260° C. to about 815° C., a pressure of from atmospheric to about 100 atmospheres, a liquid hourly space velocity (calculated on the basis of equivalent liquid volume of the charge stock contacted with the catalyst per hour divided by the volume of conversion zone containing catalyst) of about 0.2 to 15 hr$^{-1}$. Furthermore, hydrocarbon conversion conditions may include the presence of a diluent such as hydrogen. When such is the case, the hydrogen to hydrocarbon mole ratio may be from about 0.5:1 to about 30:1.

A particularly preferred application of the catalyst of the present invention is its use as a dehydrocyclization catalyst and in particular for the dehydrocyclization of $C_6$–$C_8$ nonaromatic hydrocarbons. Accordingly, a hydrocarbon charge stock comprising $C_6$–$C_8$ nonaromatic hydrocarbons is contacted with the catalyst of the present invention at dehydrocyclization conditions. Dehydrocyclization conditions include a pressure of from about 0 to about 68 atmospheres, with the preferred pressure being from about 1.7 to about 41.0 atmospheres, a temperature of from about 425° C. to about 650° C., and a liquid hourly space velocity of from about 0.1 to about 10 hr$^{-1}$. Preferably, hydrogen may be employed as a diluent. When present, hydrogen may be circulated at a rate of from about 1 to about 10 moles of hydrogen per mole of charge stock hydrocarbon.

When the catalysts of the type described above are employed in the conversion of hydrocarbons, particularly the reforming process outlined above, the activity, selectivity, and stability of these catalysts are initially quite acceptable. For example, in a dehydrocyclization process, this type of catalyst has several singular advantages, among which are increased aromatic yield, decreased rate of coke laydown on the catalyst, increased hydrogen make, enhanced stability of both the aromatic yield and temperature necessary to make octane, and excellent catalyst life before regeneration becomes necessary. However, the gradual accumulation of coke and other deactivating carbonaceous deposits on the catalyst will eventually reduce the activity and selectivity of the process to a level such that regeneration is desirable. Ordinarily, regeneration becomes desirable when about 0.5 to about 15 wt. % or more of carbonaceous deposits have been formed upon the catalyst.

When the performance of the catalyst has decayed to the point where it is desired to regenerate the catalyst, the introduction of the hydrocarbon charge stock into the conversion zone containing the catalyst is stopped and the conversion zone purged with a suitable gas stream. Thereafter, the regeneration method of the present invention is performed either in situ or the catalyst may be unloaded from the conversion zone and regenerated in an offline facility.

An essential feature of the present regeneration procedure is the presence of halogen or a haolgen-containing compound in the gaseous mixtures used during the carbon burn step. It is believed that the addition of the halogen prevents the Group VIII metal component contained in a nonacidic zeolite-containing catalyst from migrating and agglomerating into large clusters during the carbon burn step. It has been established that once the Group VIII metal component on a nonacidic zeolite-containing catalyst has clustered (or agglomerated), it is very difficult to recover the original performance level of the catalyst. This is in distinction to a nonzeolite-containing catalyst comprising a Group VIII metal where the metal has been found to be easily redispersed after agglomeration which occurs during the regeneration carbon burn step. Thus, the prevention of the migration of the Group VIII metal component on a nonacidic zeolite-containing catalyst by adding a halogen or halogen-containing compound to the regeneration gases during the carbon burn is an essential aspect of this invention.

Although a halogen gas such as chlorine, fluorine, or bromine may be used for this purpose, it is generally more convenient to employ a halogen-containing compound such as an alkylhalide, which upon exposure to the conditions utilized in these steps is decomposed to form the corresponding hydrogen halide. In addition, the hydrogen halide may be used directly; in fact, good results are achieved when a hydrogen halide is used directly in the gaseous mixtures. In general, chlorine or chlorine-containing compounds are the preferred additives for use in the present invention. The preferred mode of operation involves the use of an aqueous hydrogen chloride solution injected into the regeneration gas mixtures.

It is to be recognized that another essential feature of the subject regeneration method is that the composition of the gas streams used in the various steps thereof are carefully controlled and the positive requirements for the composition of each of these gas streams are given hereinafter in a manner which excludes the presence of other materials. In particular, it is a critical feature of the present invention that the gas streams used during the carbon burn step is substantially free of compounds of sulfur, particularly, oxides of sulfur and $H_2S$. Likewise, it may be preferable that the hydrogen stream used during the reduction step be substantially free of both water and sulfur compounds such as $H_2S$. It is therefore evident that the gas streams used in each of the steps of the present invention may be once-through streams or recycle streams, provided that in this latter case, the recycle streams are carefully controlled to ensure that the positive limitations given hereinafter on the contents of the various gas streams are satisfied and are treated by conventional techniques to ensure the absence of detrimental constituents therefrom. Furthermore, it is to be noted that the temperatures given hereinafter for each of the steps refer to the temperature of gas stream used therein just before it contacts the catalyst.

According to the regeneration method of this invention, the first essential step of the method is a carbon burn step. The carbon burn step involves contacting the deactivated catalyst with a gaseous mixture of oxygen and an inert gas. The oxygen is typically present in the gas stream in an amount ranging from 0.1 to 21.0 mole percent or higher. 21.0 Mole percent oxygen is a somewhat arbitrary upper limit that has been established because 21.0 mole percent is the concentration of oxygen in air. Since air is typically used to supply oxygen for regenerating a catalyst, 21.0 mole percent would be the maximum level obtainable assuming full air is being added to the process. However, it is contemplated that higher levels of oxygen may be used in methods where oxygen is supplied in pure form from cylinders or by other means.

As mentioned, oxygen is present in the regeneration gas used in the carbon burn step along with an inert gas. Typical inert gases useful in the carbon burn step include nitrogen, helium, carbon dioxide, and the like gases or mixtures thereof. The oxygen level as disclosed may vary from 0.1 to 21.0 mole percent or higher. The oxygen concentration may be held constant during the carbon burn step or varied throughout the carbon burn step. It is preferable that the oxygen level of the regeneration gas be slowly increased during the carbon burn step such that at the end of each carbon burn step, the regeneration gas contains about 21.0 mole percent or more of oxygen. The oxygen level will be typically increased over a period of time based upon the increase in temperature of the regeneration gas as it passes across the catalyst bed. As the differential temperature across the catalyst bed drops, the oxygen level may be increased to maintain a desired differential temperature. This results in a carbon burn step that is quick and efficient. However, if desired, the oxygen level of the regeneration may be kept at a constant low value of between 0.1 to 5.0 wt. % during the entire course of the regeneration to avoid thermal damage to the catalyst.

The carbon burn portion of the regeneration method of this invention occurs at a temperature of from 350°–600° C. Other regeneration conditions useful during the carbon burn step includes a pressure sufficient to maintain the flow of the first gaseous mixture through the zone containing the deactivated catalyst, such as a pressure of about 1 to 35 atmospheres and preferably about 1 to about 7 atmospheres, and a gas hourly space velocity (defined as the volume rate of the flow of the gas stream per hour at standard conditions divided by the volume of the bed of catalyst particles) of about 100 to about 25,000 $hr^{-1}$, with a preferred value of about 100 to about 8,000 $hr^{-1}$. The carbon burn step is performed for a first period sufficient to substantially remove carbonaceous materials from the catalyst. In general, depending obviously upon the amount of carbonaceous material present on the catalyst and upon the oxygen level of the regeneration gas, a first period of about 5 to about 30 or more hours is adequate in most cases. Ordinarily, this step is terminated when the differential temperature across the zone containing the catalyst is about zero for a period of about 0.5 to 5 hours.

As previously mentioned, a halogen or halogen-containing compound or a mixture thereof is added to the regeneration gas during the carbon burn step. The halogen or halogen-containing component is typically added to the regeneration gas such that the regeneration gas contains from 0.005 to about 5 mole percent of a halogen or halogen-containing compound. However, a range of 0.01 to about 1.0 mole percent of a halogen or halogen-containing compound in the regeneration gas is preferred.

The second, but optional, step of the present regeneration method is a second carbon burn step and involves subjecting the catalyst resulting from the first carbon burn step to contact with a gaseous mixture consisting essentially of about 0.1 to about 21.0 mole percent $O_2$ and from about 0.005 to 5.0 mole percent of a halogen or a halogen-containing compound and an inert gas such as nitrogen. The temperature utilized in this step is preferably relatively higher compared to that used in the first carbon burn step, and is selected from the range of about 400° to about 650° C. A preferred embodiment of this optional step involves the use of a temperature of at least about 20° C. higher than the temperature used in the first carbon burn step. This higher temperature helps to combust any carbon remaining on the catalyst which was not combusted in the first carbon burn step.

In addition, the oxygen level of the regeneration gas is typically increased to 21.0 mole percent oxygen or higher over the course of the second carbon burn step to remove any trace amounts of carbonaceous materials which were not burned off during the first step and to ensure that the metallic components of the catalyst are oxidized to a positive oxidation state.

The resulting carbon burned catalyst is thereafter typically purged with nitrogen or another inert gas to displace oxygen and water therefrom for a period of time which can be easily determined by monitoring the effluent gases from the zone containing the catalysts to determine when they are substantially free of oxygen and water.

After this purge step, the final essential reduction step of the present invention is commenced. The reduction step involves contacting the catalyst from the carbon burn step with a hydrogen stream at a temperature of about 300° to about 600° C. for a final period of at least about 0.5 to about 5 hours. The purged catalyst from above is cooled and purged once again with hydrogen to begin the reduction step. The catalyst is purged before temperatures are raised in the reduction step. The preferred conditions for the reduction step are temperatures of 350° to 550° C. for a period of at least about 0.5 to 4 hours. Once again, the pressure and gaseous rates utilized for this step are preferably identical to those reported in conjunction with the discussion of the carbon burn step. The purpose of this reduction step is to reduce the metallic components essentially to an elemental state and to produce a regenerated catalyst having activity, selectivity, and stability characteristics comparable to those possessed initially by the fresh catalyst. It is contemplated that this reduction step may preferentially be conducted using a substantially water-free hydrogen gas stream.

Following this reduction step, the hydrocarbon conversion process in which the catalyst is utilized may be restarted by once again charging the hydrocarbon stream and any other co-feed to the zone containing the catalyst at conditions designed to produce the desired product. In the preferred case, this involves re-establishing dehydrocyclization conditions within the zone containing the catalyst.

The following examples are given to illustrate further the regeneration method of the present invention and to indicate the benefits which are realized through the utilization thereof. It is understood that the examples are given for the sole purpose of illustration.

EXAMPLE I

In order to more fully set forth the attendant advantages of the invention, the following catalyst was prepared. A catalyst support comprising 50 wt. % alumina and 50 wt. % L-zeolite was prepared by a standard extrusion technique. In this technique, an L-zeolite powder was mixed with catapal alumina powder at a weight ratio of 1:1. A dough was formed by mixing the powder with a solution of potassium hydroxide (KOH) at a weight ratio of powder to water to KOH of 1/0.375/0.001 (powder/$H_2O$/KOH). The resulting dough was continuously extruded to form an extrudate approximately 1/16-inch in diameter. The extrudate was then calcined at 344° C. for 15 minutes followed by calcination at 555° C. for 45 minutes.

In this example, the Group VIII metal component selected for deposition on the catalyst was platinum. To this end, an impregnation method was employed for depositing the platinum component on the alumina bound L-zeolite. 526 g of the extrudate prepared as set forth above were admixed with 720 cc of solution. The solution comprised 0.79 wt. % platinum in the form of $Pt(NH_3)_4Cl_2$ and 0.48 wt. % potassium in the form of KCl in water. After evaporating to dryness, the platinum-containing extrudates were oxidized at 350° C. for 2 hours in the presence of air followed by reduction in the presence of hydrogen at 350° C. for 1.5 hours. The finished catalyst contained 1.070 wt. % platinum and 8.3 wt. % potassium.

EXAMPLE II

A catalyst as prepared in Example I was allowed to become deactivated with coke as a result of contacting the catalyst with a hydrocarbon as set forth in Example V.

25 cc of the deactivated catalyst was regenerated by a method different than that of the instant invention. This deactivated catalyst was first heated to 475° C. at essentially atmospheric pressure in the presence of 2080 cc/min (5000 GHSV) of once-through nitrogen gas. Oxygen in the form of air was introduced into the gas flowing across the catalyst at an initial level of 0.5 mole percent in order to combust the coke on the deactivated catalyst. The oxygen level was increased in increments until full air (21.0 mole percent $O_2$) was being passed across the catalyst.

Nitrogen was then introduced into the system to purge any remaining oxygen from the system while the regeneration temperature was increased to 500° C. When the catalyst temperature reached 500° C., oxygen at a level of 0.5 mole percent was reintroduced into the system at gas rates similar to those above. The same method of increasing the oxygen level was used again until only air was being passed across the catalyst. Nitrogen was reintroduced into the system and the catalyst temperature was reduced to room temperature.

The catalyst was then reduced by exposing the catalyst to hydrogen at room temperature at a flow rate of 3000 cc/min. The catalyst temperature was then raised to 500° C. and held there for 1.5 hours. This catalyst regenerated by a method not of the instant invention was designated regenerated Catalyst A.

EXAMPLE III

A catalyst as prepared in Example I was allowed to become deactivated with coke as a result of contacting the catalyst with a hydrocarbon as set forth in Example V.

26 cc of the deactivated catalyst was regenerated by a method different than that of the instant invention. The deactivated catalyst was first heated to 475° C. at essentially atmospheric pressure in the presence of a once-through stream of nitrogen flowing at a rate of 2170 cc/min (5000 GHSV). Oxygen in the form of air was introduced into the gas flowing across the catalyst at an initial concentration of 0.5 mole percent. Additionally, water at a rate of 9.5 cc/hr was injected into the regeneration gas. The oxygen level of the regeneration gas was increased in increments to 21.0 mole percent (on full air) such that the differential temperature across the catalyst bed never exceeded 20° C.

Nitrogen was then introduced into the system to purge any remaining oxygen and the catalyst temperature was raised to 500° C. At this point, oxygen in the form of air at a concentration of 0.5 mole percent and water at the same rate as above was reintroduced into the gas flowing across the catalyst. The oxygen level of the gas stream was increased to 21.0 mole percent (full air) at a rate such that the differential temperature measured across the catalyst never exceeded 20° C.

The catalyst was then cooled with nitrogen to room temperature. Hydrogen flowing at a rate of 3000 cc/min was introduced into the reactor at room temperature after which the temperature of the catalyst was raised to 500° C. and reduced in hydrogen for 1.5 hours. This catalyst, regenerated by a method not of the instant invention, was designated regenerated Catalyst B.

EXAMPLE IV

A catalyst as prepared in Example I was allowed to become deactivated with coke as a result of contacting the catalyst with a hydrocarbon as set forth in Example V.

28 cc of the deactivated catalyst was regenerated by a method of the instant invention. The deactivated catalyst was first heated to 475° C. at essentially atmospheric pressure in the presence of a once-through stream of nitrogen flowing at a rate of 2338 cc/min (5000 GHSV). Oxygen in the form of air was introduced into the gas flowing across the catalyst at an initial concentration of 0.5 mole percent. Additionally, a solution of 2.1 molar HCl at a rate of 9.5 cc/hr was injected into the regeneration gas. The oxygen level of the regeneration gas was increased in increments to 21.0 mole percent (on full air) such that the differential temperature across the catalyst bed never exceeded 20° C.

Nitrogen was then introduced into the system to purge any remaining oxygen and the catalyst temperature was raised to 500° C. At this point, oxygen in the form of air at a concentration of 0.5 mole percent was introduced into the gas flowing across the catalyst at the same rate as above. Again, a 2.1 molar solution of HCl at a rate of 9.5 cc/hr was injected into the gas passing across the catalyst. The oxygen level of the gas stream was increased to 21.0 mole percent (full air) at a rate such that the differential temperature measured across the catalyst never exceeded 20° C.

The catalyst was then cooled with flowing nitrogen to room temperature and contacted with and reduced in hydrogen flowing at a rate of 3000 cc/min at a temperature of 500° C. for 1.5 hours. This catalyst, regenerated by a method of the instant invention, was designated regenerated Catalyst C.

EXAMPLE V

In order to demonstrate the advantages attendant with the regeneration method of this invention, regenerated Catalysts A, B, and C along with a fresh catalyst from Example I and a carbon deactivated catalyst were all subjected to a test to measure their performance in the dehydrocyclization of a hydrocarbon. The test was performed in a pilot plant having a reactor containing 20 cc of catalyst and a reactor effluent on-line gas chromatograph.

The charge stock utilized in this example had the following analysis:

| | |
|---|---|
| $C_3/C_4/C_5$ paraffins | 0.4 wt. % |
| $C_6$ paraffins | 69.5 wt. % |
| $C_6$ naphthenes | 0.7 wt. % |
| $C_7$ paraffins | 21.4 wt. % |
| $C_7$ naphthenes | 8.0 wt. % |
| Total | 100.0 wt. % |

The conditions employed during testing of the catalyst were a reaction zone inlet temperature of 495° C., a 5.0 hr$^{-1}$ liquid hourly space velocity, and a reaction zone pressure of 3.4 atm. Hydrogen was admixed with the charge stock prior to contact with the catalyst. Sufficient hydrogen on a oncethrough basis was used to provide a 5:1 ratio of moles of hydrogen to moles of hydrocarbon charge stock. The test procedure followed was to first contact the catalyst with the charge stock at a reaction zone temperature of about 371° C. Thereafter, the reaction zone inlet temperature was increased to 495° C. over a 4-hour period. After reaching 495° C., the temperature was then maintained for a time period during which the reaction zone effluent was analyzed by the online gas chromatograph each hour. The results from the test are set forth in Tables 1 and 2. For purposes of interpretation of the data contained in Table 1, selectivity is defined as 100 times the weight % aromatics in the hydrocarbon products divided by conversion. In Table 2, conversion is defined as sum of weight % aromatics plus the weight % $C_1$–$C_5$ hydrocarbons in the products (corrected for the small amount in the feed).

TABLE 1

| | Aromatic Selectivity | | | | | | | | |
|---|---|---|---|---|---|---|---|---|---|
| | Hours On Stream | | | | | | | | |
| Catalyst | 10 | 20 | 30 | 40 | 50 | 60 | 70 | 80 | 90 |
| Fresh Catalyst | 87.0 | 85.5 | 84.5 | 84.4 | 84.2 | 84.1 | 84.1 | 83.7 | 83.6 |
| Spent Catalyst | 84.2 | 81.7 | 80.8 | 80.0 | 80.0 | 79.4 | — | — | — |
| Catalyst A | 58.3 | 56.0 | — | — | — | — | — | — | — |
| Catalyst B | 64.0 | 59.8 | — | — | — | — | — | — | — |
| Catalyst C | 82.3 | 82.0 | 80.6 | 79.9 | 79.5 | 78.6 | 78.6 | 78.0 | 78.0 |

TABLE 2

| | Feed Conversion | | | | | | | | |
|---|---|---|---|---|---|---|---|---|---|
| | Hours On Stream | | | | | | | | |
| Catalyst | 10 | 20 | 30 | 40 | 50 | 60 | 70 | 80 | 90 |
| Fresh Catalyst | 63.0 | 60.3 | 59.8 | 58.0 | 55.9 | 53.2 | 52.1 | 50.9 | 49.7 |
| Spent Catalyst | 52.0 | 47.6 | 43.9 | 42.0 | 41.1 | — | — | — | — |
| Catalyst A | 24.8 | 20.2 | — | — | — | — | — | — | — |
| Catalyst B | 26.0 | 20.8 | 19.0 | — | — | — | — | — | — |
| Catalyst C | 62.0 | 59.6 | 58.3 | 57.8 | 56.2 | 56.1 | 54.5 | 53.1 | 52.5 |

The results of the pilot plant testing on the regenerated catalysts and the fresh and deactivated catalyst provides a number of conclusions. First and most importantly, when comparing the performance of the regenerated Catalysts A, B, and C, it is evident that Catalyst C of this invention regenerated in the presence of an aqueous solution of hydrochloric acid is far superior in conversion and selectivity than Catalyst A regenerated without water and halogen in the carbon burn step and Catalyst B regenerated without a halogen in the carbon burn step. This comparison proves that it is the presence of the halogen in the carbon burn step and not the water that improves the post-regeneration characteristics of a platinum containing no acidic zeolite catalyst.

Next, the conversion and selectivity performance of Catalyst C, regenerated by a method of this invention, is compared with the performance of the fresh catalyst and the spent catalyst, both having never been regenerated. The selectivity performance of Catalyst C while not an improvement over that of the spent catalyst is far superior to Catalyst A, regenerated without halogen. However, the conversion performance of Catalyst C of this invention is superior to that of all catalysts tested except for the fresh catalyst and it is equivalent to the fresh catalyst conversion. Thus while the selectivity of the catalyst regenerated by the method of the instant invention is not returned to a level similar to that of the fresh catalyst, the conversion ability of the catalyst is. Therefore, the regeneration method of this invention comes quite close to returning the catalyst of this invention to a level of activity similar to that of the fresh catalyst.

What is claimed is:

1. A method for regenerating a deactivated hydrocarbon conversion catalyst comprising a nonacidic zeolite and at least one Group VIII metal component, the catalyst having become deactivated by deposition of carbonaceous materials as a result of previous contact with a hydrocarbon feedstock at hydrocarbon conversion conditions, said regenerating method consisting of the steps of:
   (a) contacting the deactivated catalyst with a gaseous stream comprising oxygen, and a halogen or a halogen-containing compound or a mixture thereof, and an inert component at regeneration conditions including a temperature of from 300°–600° C. sufficient to combust at least a portion of said carbonaceous materials for a first period of time; and
   (b) reducing the catalyst from step (a) by contacting the catalyst with a gaseous stream comprising hydrogen at an elevated temperature for a second period of time sufficient to produce a reduced and regenerated hydrocarbon conversion catalyst.

2. The method of claim 1 further characterized in that the halogen or halogen-containing compound is chlorine or a compound of chlorine.

3. The method of claim 1 further characterized in that the oxygen content of the oxygen-containing gaseous stream of step (a) may be varied from 0.1 to 21.0 mole percent during the first period of time.

4. The method of claim 1 further characterized in that the Group VIII metal component of the catalyst is selected from the group platinum, palladium, osmium, iridium, rhodium, ruthenium, nickel, and mixtures thereof.

5. The method of claim 1 further characterized in that the Group VIII metal component is platinum, or palladium, or mixtures thereof.

6. The method of claim 1 further characterized in that the nonacidic zeolite comprises L-zeolite.

7. The method of claim 1 further characterized in that the catalyst comprises an alkali metal.

8. The method of claim 7 further characterized in that the alkali metal is potassium.

9. The method of claim 1 further characterized in that the catalyst is bound with a support matrix comprising silica, alumina, or mixtures thereof.

10. A method for regenerating a deactivated hydrocarbon conversion catalyst comprising an L-zeolite bound within a support matrix comprising alumina, platinum, and sufficient surface-deposited potassium to provide a surface-deposited alkali metal index of 10, the catalyst having become deactivated by deposition of carbonaceous materials as a result of previous contact with a hydrocarbon feedstock at hydrocarbon conversion conditions, said regeneration method consisting of the steps of:

(a) contacting the deactivated catalyst with a gaseous stream comprising oxygen, hydrogen chloride, and an inert component at regeneration conditions including a temperature of from 300°–600° C. and a gaseous stream oxygen concentration of from 0.1 to 21.0 mole percent sufficient to combust at least a portion of said carbonaceous materials for a first period of time; and (b) reducing the catalyst from step (a) by contacting the catalyst with a gaseous stream comprising hydrogen at a temperature of from 370°–600° C. for a period of time sufficient to produce a reduced and regenerated hydrocarbon conversion catalyst.

11. The method of claim 10 further characterized in that the inert component of the gaseous stream of step (a) is nitrogen.

12. The method of claim 10 further characterized in that the gaseous stream comprising hydrogen of step (b) is substantially water free.

13. The method of claim 10 further characterized in that the catalyst from step (a) is purged with a gaseous stream in the absence of a halogen-containing component before being reduced in step (b).

14. The method of claim 13 further characterized in that following the purge step and before being reduced, the regeneration temperature is dropped to between 100° and 300° C. and purged with a gaseous stream before the reduction step (b).

* * * * *